United States Patent
Morimoto

[19]

[11] Patent Number: 5,953,956
[45] Date of Patent: Sep. 21, 1999

[54] PINION OF STARTER MOTOR FOR INTERNAL COMBUSTION ENGINE

[75] Inventor: Yoshihiro Morimoto, Tokyo, Japan

[73] Assignee: Mitsubishi Denki Kabushiki Kaisha, Tokyo, Japan

[21] Appl. No.: 08/911,732

[22] Filed: Aug. 15, 1997

[30] Foreign Application Priority Data

Apr. 18, 1997 [JP] Japan ..................................... 9-101949

[51] Int. Cl.$^6$ .............................. F02N 19/34; F16H 55/17
[52] U.S. Cl. ................................. 74/7 A; 74/7 E; 74/7 R; 74/460
[58] Field of Search ............................. 74/7 A, 7 E, 7 R, 74/460

[56] References Cited

U.S. PATENT DOCUMENTS

| | | |
|---|---|---|
| 2,188,902 | 4/1940 | Kauffman . |
| 4,631,434 | 12/1986 | Asaoka et al. . |
| 4,818,889 | 4/1989 | Kinoshita . |
| 4,855,610 | 8/1989 | Morishita et al. .......................... 74/7 A |
| 4,926,705 | 5/1990 | Morishita et al. . |
| 4,958,530 | 9/1990 | Jaseck et al. .............................. 74/7 A |
| 5,035,151 | 7/1991 | Isozumi . |
| 5,179,864 | 1/1993 | Ueta et al. ................................ 74/7 A |

FOREIGN PATENT DOCUMENTS 1346241  11/1963  France .

*Primary Examiner*—Charles A Marmor
*Assistant Examiner*—Roger Pang
*Attorney, Agent, or Firm*—Sughrue, Mion, Zinn, Macpeak & Seas, PLLC

[57] ABSTRACT

A pinion (7A) of a starter motor for an internal combustion engine, which pinion has an outer peripheral surface formed with gear teeth (7G) and an inner peripheral surface snugly fit with a bearing (8) so that the pinion can slideably move along an output shaft (6) of the starter motor through the medium of the bearing (8). The internal combustion engine is started by the starter motor through a ring gear of the engine which gear is caused to mesh with the gear teeth of the pinion upon starting of the engine. An inner diameter of a tip end portion (7a) of the pinion at which the pinion is brought into contact with the ring gear upon meshing therewith is so dimensioned as to lie between an inner diameter and an outer diameter of the bearing (8) in order to increase the strength of the pinion. The pinion can be realized in a small size and light weight by decreasing the number of teeth thereof while ensuring a desired strength for the output shaft of the starter motor as well as that for the tooth bottom portion of the pinion.

3 Claims, 4 Drawing Sheets

PINION OF STARTER MOTOR FOR INTERNAL COMBUSTION ENGINE

BACKGROUND OF THE INVENTION

1. Field of the Invention

The present invention relates to a pinion of a starter motor employed in an internal combustion engine for a motor vehicle or the like. More particularly, the invention is concerned with a pinion of a starter motor for an internal combustion engine which pinion can be implemented in a small size and light weight.

2. Description of Related Art

For having better understanding of the invention, description will first be made in some detail of the technical background by reference to FIGS. 4, 5 and 6, in which FIG. 4 is side elevational view showing partially in section a hitherto known or conventional starter motor for an internal combustion engine disclosed, for example, in Japanese Unexamined Patent Application Publication No. 37785/1995 (JP-A-7-37785), FIG. 5 is an enlarged side view showing in section a pinion incorporated in the starter motor shown in FIG. 4, and FIG. 6 is an end view of the same as viewed in the axial direction in FIG. 4.

Referring to the figures, a starter motor (also known as the cranking motor) employed for starting an internal combustion engine (not shown) is provided with an electromagnetic switch unit 1 mounted on the starter motor for driving a plunger 2 in the axial direction.

A lever 3 interlocked with the plunger 2 has a tip end portion adapted to engage with the plunger 2 and a bottom end portion adapted to engage with a rear end face (end face opposite to an operative end face) of an overrunning clutch unit 4, as will be described later on. The lever 3 is mounted rotatably about a supporting member 3a functioning as a fulcrum.

The starter motor includes an armature 5 driven rotationally and an output shaft 6 formed as an integral part extending from a rotatable shaft of the armature 5. Formed in an outer periphery of the output shaft 6 is a helical spline (not shown) which meshes with the overrunning clutch unit 4 so that the latter can slideably move along the output shaft 6, being guided by the helical spline.

A pinion 7 adapted to mesh with a ring gear (not shown) of the internal combustion engine (not shown either) is operatively coupled with the overrunning clutch unit 4 such that the pinion 7 can rotate only in one direction (i.e., the direction in which the internal combustion engine is started).

A plurality of gear teeth 7G are formed in an outer peripheral surface of the pinion 7 so as to mesh with the ring gear of the engine while a bearing 8 is snugly mounted on an inner periphery of the pinion 7. In this conjunction, it should be added that the pinion 7 is adapted to move slideably in the axial direction along the output shaft 6.

Next, description will be directed to the operation of the pinion of the conventional starter motor for the internal combustion engine described above.

When a key switch (not shown) of the internal combustion engine is manually closed by a driver, an exciting coil (not shown) of the electromagnetic switch unit 1 is electrically energized, whereby the plunger 2 is attracted under a magnetic force to move rearwardly (i.e., toward the left-hand side as viewed in FIG. 4).

As the plunger 2 moves, as mentioned above, the lever 3 rotates around the supporting member 3a serving as the fulcrum, as a result of which the overrunning clutch unit 4 is forced to move forwardly (to the right-hand side as viewed in FIG. 1).

Consequently, the pinion 7 coupled with the overrunning clutch unit 4 moves forwardly together with the overrunning clutch unit 4 along the output shaft 6 with the gear teeth 7G being brought to the state in which it meshes with the ring gear of the internal combustion engine.

Furthermore, as the plunger 2 moves under the attraction of the electromagnetic switch unit 1, as mentioned above, a movable contact (not shown) of the electromagnetic switch unit 1 moves to bear against a stationary contact (not shown) disposed at a rear position.

In this way, the armature 5 is electrically energized to be thereby rotated to generate a torque which is transmitted to the pinion 7 by way of the helical spline and the overrunning clutch unit 4 and finally to the internal combustion engine by way of the ring gear which meshes with the gear teeth 7G of the pinion 7.

As is apparent from the above, the internal combustion engine is started through the medium of the pinion 7 designed to mesh with the ring gear. In this conjunction, there has arisen a demand for small-size implementation or miniaturization of the starter motor in recent years in view of installation of an increased number of peripheral auxiliary machines for the internal combustion engine of the motor vehicle and reduction in the fuel cost.

As the method for the realization of miniaturization of the starter motor, it is conceivable to increase the gear ratio between the pinion 7 and the ring gear to thereby reduce the weight of the starter motor by a proportion corresponding to the increment of the gear ratio.

As the practical means for increasing the gear ratio, there may be mentioned two methods, i.e., first method of increasing the number of teeth of the ring gear and second method of decreasing the number of the gear teeth 7G of the pinion 7.

However, the first method is disadvantageous in that the diameter of the internal combustion engine as well as that of the transmission increases as the number of the teeth of the ring gear increases, involving the necessity for increasing the available space of the engine room of the motor vehicle while taking into account the layout of the components therein, which in turn means that the weight of the motor vehicle will ultimately be increased.

On the other hand, the second method can not realize any sufficient reduction of the weight because limitation is inevitably imposed on the decrease of the gear teeth 7G of the pinion 7 in view of the fact that the strength of the output shaft 6 as well as that of the tooth bottom portion of the pinion 7 is thereby lowered.

In general, for the pinion 7 employed in the starter motor, at least eight teeth are required in case the module is 2.54 (corresponding to the diametrical pitch of "10") in order to ensure an adequate strength while at least 9 teeth are required in case the module is 2.117 (corresponding to the diametrical pitch of "12"). In this conjunction, the module is defined as a quotient derived by dividing the diameter of the pitch circle of the pinion by the number of teeth.

Parenthetically, the applicable value of module is determined in dependence on the specifications of the ring gear. In the case of the pinion 7 shown in FIG. 6, it is assumed that the pinion 7 is provided with nine teeth with the module being 2.117 (corresponding to the diametrical pitch of "12").

For the reasons mentioned above, when the pinion 7 is to be implemented with a lesser number of teeth than the lower limit mentioned above, it is then required to realize at least the output shaft 6 in a smaller diameter or decrease the thickness of the bottom portions of the teeth of the pinion 7, which however means that the pinion 7 or the output shaft 6 may be injured under excessively large load or shock applied to the pinion 7.

As will now be appreciated from the foregoing, the pinion of the starter motor for the internal combustion engine known heretofore suffers a problem that the weight of the pinion 7 can not be decreased without impairing the strength thereof because the pinion 7 is so formed that the inner diameter thereof is to be constant in the axial direction.

SUMMARY OF THE INVENTION

In the light of the state of the art described above, it is an object of the present invention to provide a pinion of a starter motor for an internal combustion engine, which pinion can be implemented in a small size and light weight by decreasing the number of teeth while ensuring an adequate or sufficient strength for the output shaft of the starter motor as well as for the tooth bottom portion of the pinion.

Thus, the invention is directed to a pinion of a starter motor for an internal combustion engine, which pinion has an outer peripheral surface formed with gear teeth and an inner peripheral surface snugly fit with a bearing so that the pinion can slidably move along an output shaft of the starter motor through the medium of the bearing, wherein the internal combustion engine is started by the starter motor through a ring gear of the internal combustion engine which is caused to mesh with the gear teeth of the pinion.

In view of the aforementioned object as well as other objects which will become apparent as the description proceeds, it is proposed according to a general aspect of the present invention that an inner diameter of a tip end portion of the pinion at which it is brought into contact with the ring gear upon meshing therewith is so dimensioned as to lie between an inner diameter and an outer diameter of the bearing in order to increase strength of said pinion.

In a preferred mode for carrying out the invention, the pinion may have a rear end portion which is formed in a frustoconical shape at a side in opposition to the tip end portion in order to further increase the strength of the pinion.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Figure 1:
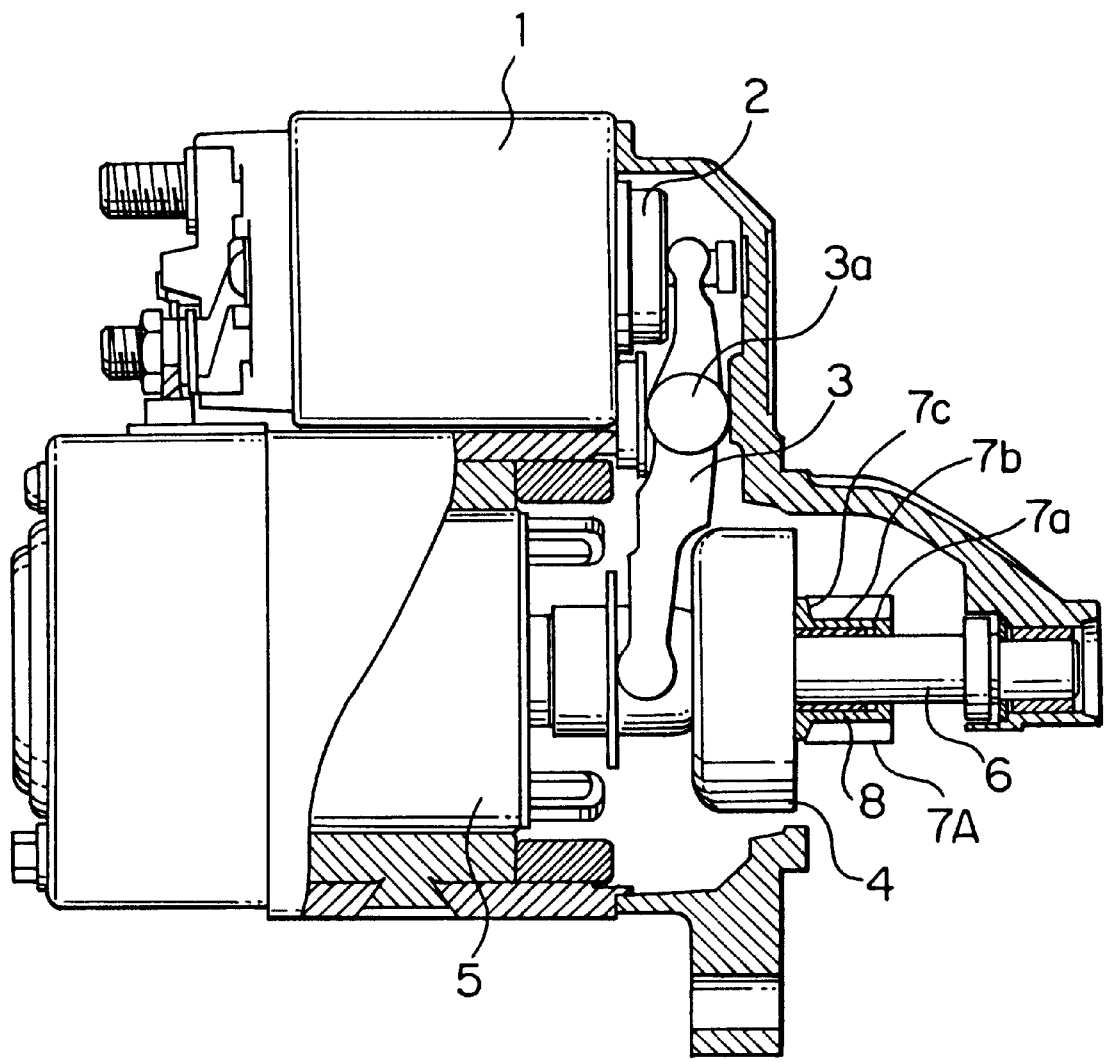
FIG. 1 is a side elevational view showing partially in section a starter motor for an internal combustion engine according to an embodiment of the invention.

Now, the present invention will be described in detail in conjunction with what is presently considered as preferred or typical embodiment thereof by reference to the drawings. In the following description, like reference characters designate like or corresponding parts throughout the several views. Also in the following description, it is to be understood that such terms as "left", "right", "top", "bottom", "upward", "downward" and the like are words of convenience and are not to be construed as limiting terms.

An embodiment of the invention will be described below. FIG. 1 is a side elevational view showing partially in section a starter motor according to an embodiment of the present invention, FIG. 2 is an enlarged sectional view showing a pinion incorporated in the starter motor shown in FIG. 1, and FIG. 3 is an end view of the pinion as viewed in the axial direction in FIG. 1.

Figure 2:
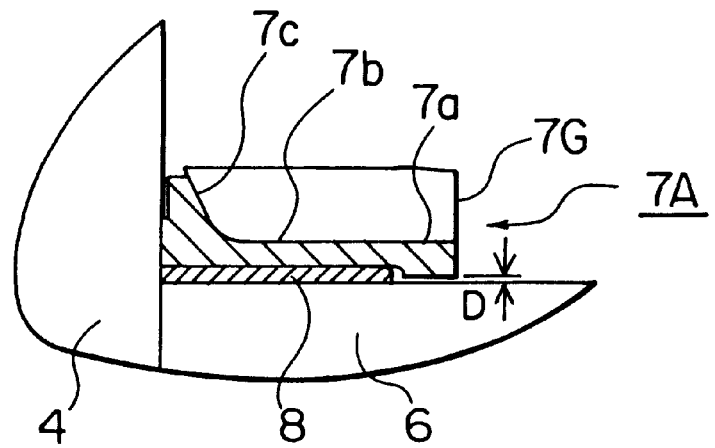
FIG. 2 is an enlarged side elevational view showing partially in section a pinion mounted on an output shaft of the starter motor shown in FIG. 1.
Figure 3:
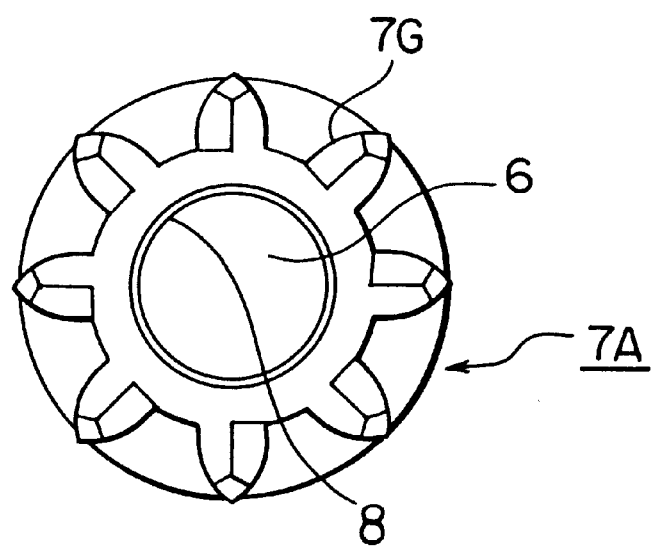
FIG. 3 is an end view of the pinion as viewed in the axial direction in FIG. 1.
Figure 4:
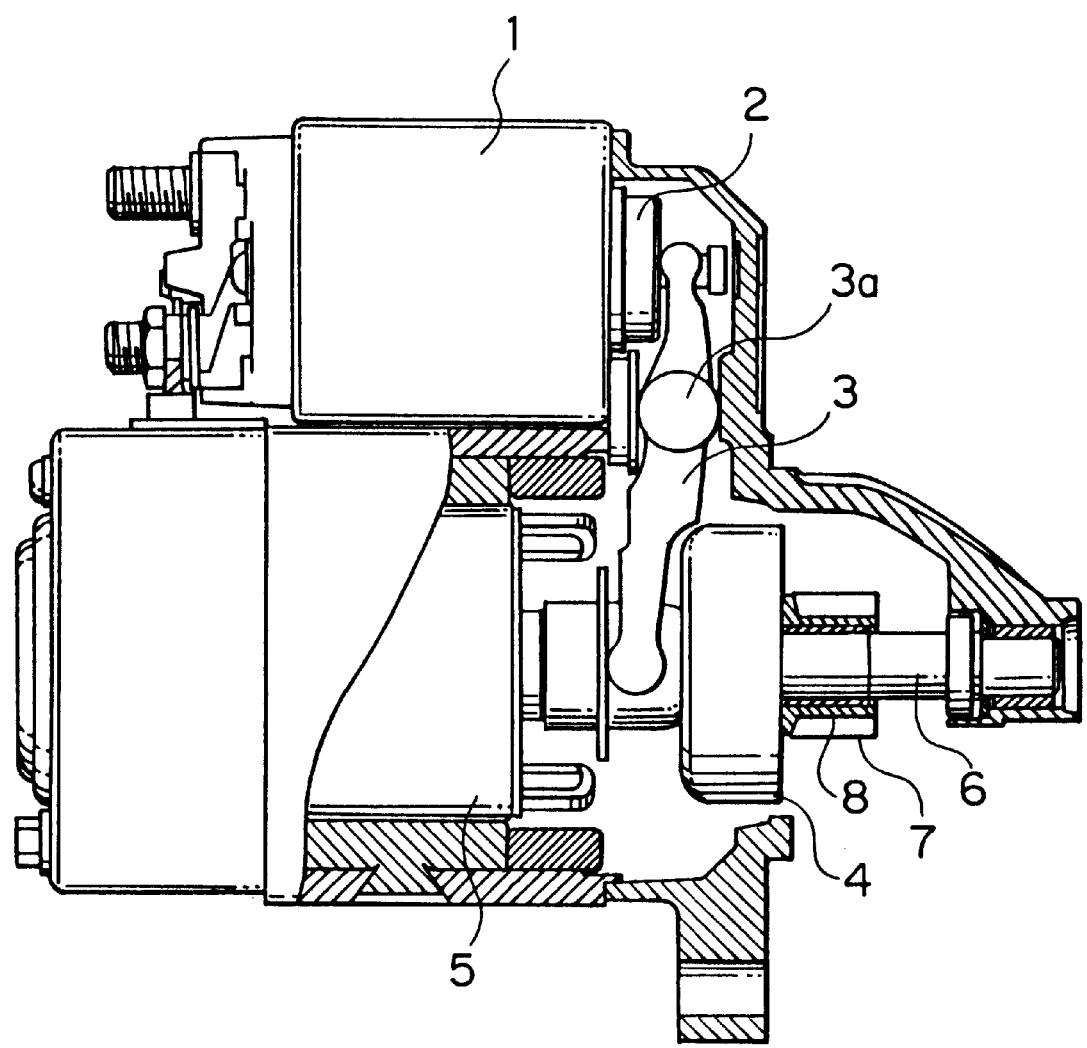
FIG. 4 is a side elevational view showing partially in section a Conventional starter motor for an internal combustion engine.
Figure 5:
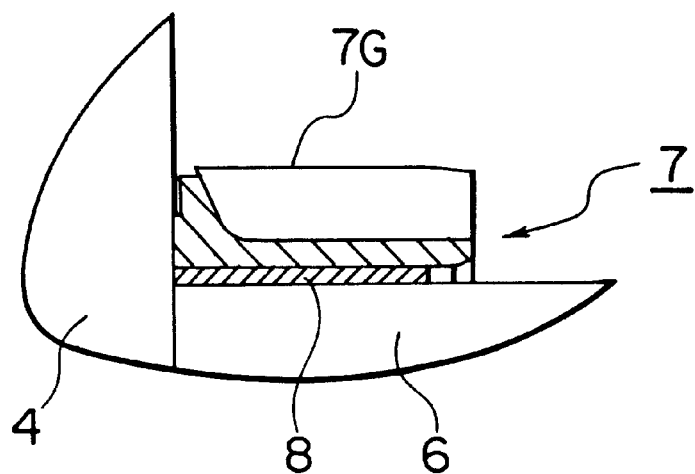
FIG. 5 is an enlarged side view showing partially in section a pinion mounted on an output shaft of the starter motor shown in FIG. 4.
Figure 6:
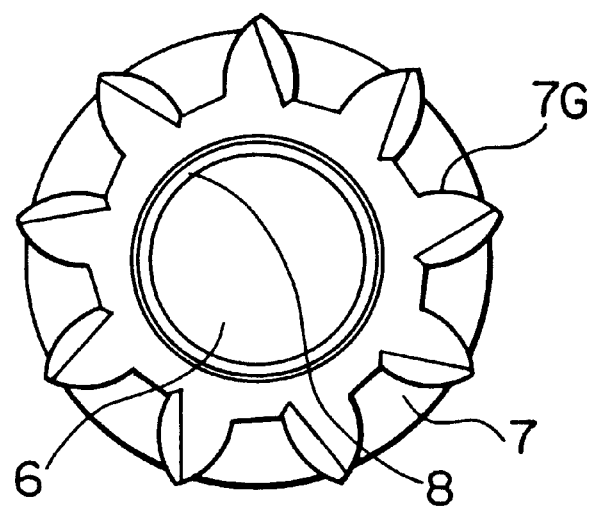
FIG. 6 is an end view of the pinion as viewed in the axial direction in FIG. 4.

In FIGS. 1, 2 and 3, like parts or components as those described hereinbefore by reference to FIGS. 4 to 6 are denoted by like reference symbols, and repeated description thereof is omitted.

Further, basic operation of the starter motor shown in FIGS. 1 to 3 is essentially same as that of the conventional starter motor described hereinbefore. Accordingly, detailed description thereof will be unnecessary.

Referring to FIGS. 1 to 3, the pinion according to the instant embodiment of the invention is generally denoted by 7A. In the pinion 7A, the inner peripheral surface or inner diameter of a tip end portion 7a is constricted in such manner that the inner peripheral surface mentioned above faces in opposition to an outer peripheral surface of the output shaft 6 with a small air gap D being left therebetween, as can be seen in FIG. 2, and thus the inner diameter of the tip end portion 7a of the pinion 7A is set to be shorter than the inner diameter of an intermediate portion 7b and a rear end portion 7c of the pinion 7A.

More specifically, the inner diameter of the tip end portion 7a of the pinion 7A is so dimensioned as to fall within a range between the inner diameter and the outer diameter of the bearing 8 in order to ensure a sufficient strength for the tooth bottom portion of the pinion 7A.

On the other hand, the inner diameter of the intermediate portion 7b of the pinion 7A is selected substantially equal to the outer diameter of the bearing 8, wherein the rear end portion 7c of the pinion 7A is formed in a collar-like or frustoconical shape in order to realize the desired strength of the pinion 7A.

By forming the tip end portion 7a of the pinion 7A in the constricted shape, as shown in FIG. 2, the number of the gear teeth 7G of the pinion 7A can be decreased to eight, as illustrated in FIG. 3, in case the module of the pinion 7A is 2.117 (corresponding to the diametrical pitch of "12") as described hereinbefore by reference to FIG. 6.

As a result of this, the outer diameter of the pinion 7A as well as the diameter of the root circle of the pinion 7A can be shortened.

Although the outer diameter of the output shaft 6 is dimensioned to be short with a view to ensuring a sufficient thickness for the tooth bottom portions of the gear teeth 7G of the pinion 7A, it is not preferred to decrease excessively the outer diameter of the output shaft 6 because, if otherwise, the strength of the output shaft 6 will be lowered, to disadvantage.

Under the circumstances, the thickness of the tooth bottom portion of the pinion 7A in the intermediate portion 7b is decreased when compared with the conventional pinion shown in FIG. 4, as can be seen from FIG. 2.

Referring to FIG. 1, in the state where the pinion 7A is pushed forwardly by the lever 3 to a position at which the gear teeth 7G are caused to mesh with the ring gear, load or shock applied to the pinion 7A becomes maximum at the tip end portion 7a of the pinion 7A.

Usually, the pinion 7A is formed by a cold forging process. Further, the rear end portion 7c is formed in a frustoconical shape in section. Consequently, the strength of the pinion 7A is lowermost at the tip end portion 7a.

Thus, by imparting a sufficient thickness to the tip end portion 7a of the low strength by forming it in the constricted shape to thereby thicken the tip end portion 7a, as mentioned previously, the pinion 7A can be implemented with a smaller number of the teeth when compared with the conventional pinion without incurring any problem in respect to the strength of the pinion 7A.

In the foregoing description, it has been assumed that the module of the pinion 7A is 2.117 (i.e., the diametrical pitch is "12") with the number of the gear teeth 7G being decreased to eight. In this conjunction, it is self-explanatory that the number of the gear teeth 7G can be decreased to seven in the case of the pinion whose module is 2.54 (corresponding to the diametrical pitch of "10").

Many modifications and variations of the present invention are possible in the light of the above techniques. It is therefore to be understood that within the scope of the appended claims, the invention may be practiced otherwise than as specifically described.

What is claimed is:

1. A pinion of a starter motor for an internal combustion engine, said pinion having an outer peripheral surface formed with gear teeth and an inner peripheral surface snugly fit with a bearing, said bearing being concentrically provided between said pinion and an output shaft, so that said pinion can slidably move along said output shaft of said starter motor through the medium of said bearing, said internal combustion engine being started by said starter motor through a ring gear incorporated in said internal combustion engine, which gear is caused to mesh with said gear teeth of said pinion for starting said internal combustion engine, wherein an inner diameter of a tip end of said pinion at which said pinion is brought into contact with said ring gear upon meshing therewith is so dimensioned as to fall within a range defined by an inner diameter and an outer diameter of said bearing in order to increase strength of said pinion.

2. A pinion according to claim 1, wherein said pinion has a rear end portion which is formed in a frustoconical shape at a side in opposition to said tip end portion in order to further increase strength of said pinion.

3. A pinion of a starter motor for an internal combustion engine comprising, a pinion having an outer peripheral surface and an inner peripheral surface, said outer peripheral surface of said pinion having gear teeth;

an output shaft; and a bearing having an inner diameter and an outer diameter, said bearing being concentrically provided between said inner peripheral surface of said pinion and said output shaft, wherein said bearing slidably engages said output shaft, and wherein said pinion extends past said bearing along an axis of said output shaft forming a tip section, said tip section extending in a radial direction toward said axis of said output shaft and terminating within a range defined by said inner diameter and said outer diameter of said bearing.

* * * * *